United States Patent [19]
Yoshida et al.

[11] Patent Number: 5,470,496
[45] Date of Patent: Nov. 28, 1995

[54] WORKING FLUID CONTAINING CHLOROTETRAFLUOROETHANE

[75] Inventors: Yuji Yoshida, Itami; Masami Funakura, Hirakata; Kazuo Nakatani, Kadoma; Minoru Tagashira, Hirakata, all of Japan

[73] Assignee: Matsushita Electric Industrial Co., Ltd., Japan

[21] Appl. No.: 247,400

[22] Filed: May 23, 1994

Related U.S. Application Data

[63] Continuation of Ser. No. 909,673, Jul. 7, 1992, abandoned.

[30] Foreign Application Priority Data

Jul. 12, 1991 [JP] Japan ................. 3-172370
Oct. 28, 1991 [JP] Japan ................. 3-281042

[51] Int. Cl.$^6$ ............................ C09K 5/04
[52] U.S. Cl. .......................... 252/67; 62/114
[58] Field of Search ................. 252/67; 62/114

[56] References Cited

U.S. PATENT DOCUMENTS

| | | | |
|---|---|---|---|
| 4,810,403 | 3/1989 | Bivens et al. | 252/67 |
| 4,957,652 | 9/1990 | Tamura et al. | 252/67 |

FOREIGN PATENT DOCUMENTS

| | | |
|---|---|---|
| 0299614 | 1/1989 | European Pat. Off. |
| 0430131 | 6/1991 | European Pat. Off. |
| 0451692 | 10/1991 | European Pat. Off. |
| 0509673 | 10/1992 | European Pat. Off. |
| 59-117580 | 7/1984 | Japan . |
| 3-287668 | 12/1991 | Japan . |
| 9211338 | 7/1992 | WIPO . |
| 9211339 | 7/1992 | WIPO . |

OTHER PUBLICATIONS

Patent Abstracts of Japan, 15(409), abstracting JP-A-31 68 265 (Jul. 22, 1991).
Patent Abstracts of Japan 15(409), abstracting JP-A-31 68 281 (Jul. 22, 1991).
Patent Abstracts of Japan, 8(236), abstracting JP-A-59 117 579 (Jul. 6, 1984).
Patent Abstracts of Japan, 15(239) abstracting JP-A-30 75 449 (Mar. 29, 1991).
Database WPIL, Week 8433 abstracting JP-A-59 117 580 (Jul. 6, 1984).

*Primary Examiner*—Christine Skane
*Attorney, Agent, or Firm*—Wenderoth, Lind & Ponack

[57] ABSTRACT

A working fluid containing chlorotetrafluoroethane and at least two fluorinated hydrocarbons having a boiling point of not higher than −40° C. under atmospheric pressure selected from the group consisting of methane derivatives and ethane derivatives which consist of one or two carbon atoms, hydrogen atoms and fluorine atoms, which has very small influence on the ozone layer in the stratosphere and decreased flammability and is suitable as a substitute working fluid for chlorodifluoromethane.

8 Claims, 6 Drawing Sheets

WORKING FLUID CONTAINING CHLOROTETRAFLUOROETHANE

This application is a continuation of now abandoned application, Ser. No. 07/909,673, filed Jul. 7, 1992.

BACKGROUND OF THE INVENTION

1. Field of the Invention

The present invention relates to a working fluid which comprises plural halogenated hydrocarbons and is used in air conditioners and heat pumps and the like.

2. Description of the Related Art

Hitherto, as working fluids in air conditioners, heat pumps and the like, are used halogenated hydrocarbons derived from methane or ethane, which are also called as fluorinated halocarbons. They work at such utilization temperature that a condensation temperature and/or an evaporation temperature are from about 0 (zero) to about 50° C. Among them, chlorodifluoromethane ($CHClF_2$, R22) with a boiling point of −40.8° C. is widely used as a working fluid in an air conditioner for a building and a large size refrigeration system.

Recently, depletion of the ozone layer in the stratosphere with the fluorinated halocarbon is seriously discussed as one of global environmental problems, and amounts to be used and produced of some fully halogenated chlorofluorocarbons (CFCs) which have high ozone depletion potential are limited by the Montreal Protocol. In future, their use and production will be banned.

R22 has an ozone depletion potential (hereinafter referred to as "ODP") of 0.05 when ODP of trichlorofluoromethane ($CCl_3F$, R11) is defined to be 1 (one). Though $R_{22}$ is not a CFC, its production and use are expected to increase and it is expected that R22 will have significant influences on the human living in future, since the air conditioners and the heat pumps are and will be widely used. Therefore, it is highly desired to quickly develop a working fluid which has a small ODP and can be used as a substitute for R22.

U.S. Pat. No. 4,810,403 to Vivens et al discloses, as a substitute for dichlorodifluoromethane (R12, boiling point of −29.8° C.), a refrigerant comprising a first halocarbon having a boiling point at atmospheric pressure in the range of about −50° C. to about −30° C., a second halocarbon having a boiling point at atmospheric pressure in the range of about −30° C. to about −5° C. and a third halocarbon having a boiling point at atmospheric pressure in the range of about −5° C. to 30° C., which has substantially the same vapor pressure as R12. One example of the refrigerant composition is a mixture of R22, R152a and R114. This patent does not suggest any composition which can be used as a substitute for R22.

SUMMARY OF THE INVENTION

An object of the present invention is to provide a working fluid which comprises three fluorinated halocarbons and has less influence on the ozone layer in the stratosphere and can be used as a substitute for R22.

According to the present invention, there is provided a working fluid comprising chlorotetrafluoroethane and at least two fluorinated hydrocarbons having a boiling point of not higher than −40° C. under atmospheric pressure selected from the group consisting of methane derivatives and ethane derivatives which consist of one or two carbon atoms, hydrogen atoms and fluorine atoms (hereinafter referred to as "fluorinated methane or ethane derivative").

DETAILED DESCRIPTION OF THE INVENTION

Among the components of the working fluid of the present invention, chlorotetrafluoroethane ($C_2HClF_4$, ODP=0.02) contains both the chlorine atom and the hydrogen atom in a molecular structure, has very small ozone depletion potential and is nonflammable.

Since the fluorinated methane or ethane derivatives have no chlorine atom in molecular structures, they have substantially no ozone depletion potential.

The fluorinated methane or ethane derivatives are mixed with chlorotetrafluoroethane to provide a composition having substantially the same boiling point as R22.

Among the fluorinated methane or ethane derivatives, trifluoromethane ($CHF_3$, ODP=0), difluoromethane ($CH_2F_2$, ODP=0), pentafluoroethane ($C_2HF_5$, ODP=0) and trifluoroethane ($C_2H_3F_3$, ODP=0) are preferred.

The working fluid of the present invention has much smaller influences on the ozone layer in the stratosphere than R22, since it comprises chlorotetrafluoroethane which has both the chlorine atom and the hydrogen atom and a very small ozone depletion potential (ODP=0.02) and the fluorinated methane or ethane derivatives having the boiling point not higher than −40° C. which contain no chlorine atom in the molecular structure and have substantially no ozone depletion potential. While some of the fluorinated methane or ethane derivatives having no chlorine atom in the molecular structure are flammable, chlorotetrafluoroethane is nonflammable. Therefore, the flammability of the mixture is greatly decreased.

In a specific composition range, the working fluid of the present invention has substantially the same vapor pressure as R22 in a utilization temperature range between about 0° C. to about 50° C., and is suitable as a working fluid which can be used in presently used apparatuses as a substitute for R22.

The working fluid of the present invention is expected to have very small ODP and very promising as a substitute for R22.

In addition, since the working fluid of the present invention is a non-azeotropic mixture and has a temperature gradient in the condensing and evaporating processes, a higher coefficient of performance (COP) than R22 is expected when Lorenz cycle in which a temperature difference from a heat source is decreased is assembled.

The fluorinated halocarbons having the ozone depletion potential tend to have large global warming potential (hereinafter referred to as "GWP") when their ODP is large. Since the working fluid of the present invention comprises the above three essential components, its GWP may be substantially the same as or smaller than that of R22. Therefore, the working fluid of the present invention may have smaller influence on the global warming. In particular, GWP of chlorotetrafluoroethane is reported to be about one third of that of R22. From this point, the working fluid of the present invention is useful and attractive.

PREFERRED EMBODIMENTS OF THE INVENTION

The present invention will be illustrated by following Examples.

EXAMPLE 1

Figure 1:
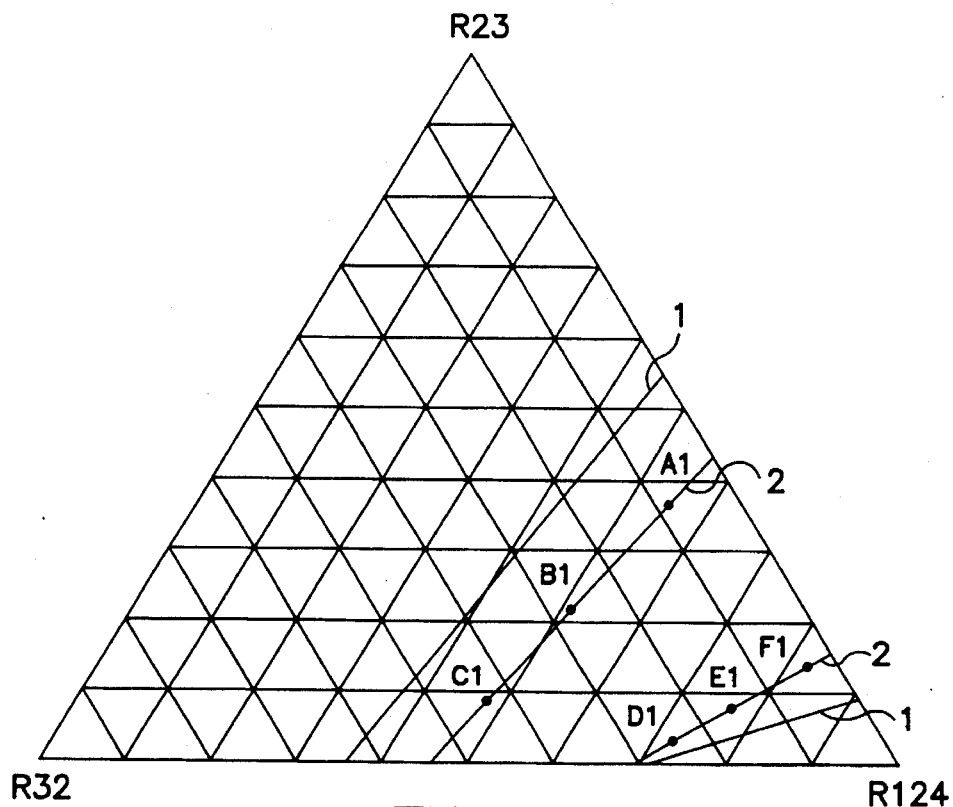
FIGS. 1 to 12 are ternary composition diagrams of the working fluids in Examples 1 to 6.

FIG. 1 shows a ternary composition diagram indicating equilibrium states of a mixture consisting of trifluoromethane (R23), difluoromethane (R32) and 2-chloro-1,1,1,2-tetrafluoroethane (R124) at specific temperatures under specific pressure in a triangular coordinate.

In the triangular coordinate, in the counterclockwise direction from the top vertex, single compounds are assigned on the vertexes from a compound having the lowest boiling point to one having the highest boiling point. A composition (weight ratio) of the three compounds at one point on the triangular coordinate is expressed by a ratio of distances between said point and the opposite sides. The distance between said point and the opposite side corresponds to a proportion of the compound which is assigned to the vertex which faces said side.

In FIG. 1, the lines 1 are phase equilibrium lines of the mixture at 0° C. under pressure of 4.044 kg/cm$^2$G. These temperature and pressure correspond to a saturated state of R22. The upper one of the phase equilibrium lines 1 (corresponding to R22 at 0° C.) is a saturated vapor line, and the lower one is a saturated liquid line. In the area between these two lines, the mixture is in the phase equilibrium state. The lines 2 are phase equilibrium lines of the mixture at 50° C. under pressure of 18.782 kg/cm$^2$G. These temperature and pressure correspond to a saturated state of R22.

If R23 alone is used, it exceeds the critical temperature at 50° C. However, the mixture has the saturated state so that it can be used in the air conditioner or heat pump which has the utilization temperature range between about 0° C. and about 50° C.

As understood from FIG. 1, the mixture comprising about 0 to about 55% by weight (for example, about 1 to about 55% by weight) of R23, about 0 to about 65% by weight (for example, about 1 to about 65% by weight) of R32 and about 35 to about 90% by weight of R124 is preferred, since it has substantially the same vapor pressure as R22 in the utilization temperature range between about 0° C. and about 50° C. Further, the mixture comprising about 0 to about 45% by weight (for example, about 1 to about 45% by weight) of R23, about 0 to about 55% by weight (for example, about 1 to about 55% by weight) of R32 and about 45 to about 85% by weight of R124 is more preferred, since it has substantially the same vapor pressure as R22 at all the utilizing temperatures between 0° C. and 50° C.

The compositions of the working fluids at the points A1 to F1 in FIG. 1 are shown in Table 1.

TABLE 1

| Point | A1 | B1 | C1 | D1 | E1 | F1 |
|---|---|---|---|---|---|---|
| R23 (wt. %) | 35.8 | 21.2 | 9.1 | 2.9 | 6.7 | 11.6 |
| R32 (wt. %) | 8.8 | 27.1 | 42.3 | 24.2 | 15.5 | 5.0 |
| R124 (wt. %) | 55.4 | 51.7 | 48.6 | 72.9 | 77.8 | 83.4 |

The points A1, B1 and C1 are on the saturated vapor line of the phase equilibrium lines 2 (corresponding to R22 at 50° C.), and the points D1, E1 and F1 are on the saturated liquid line of the phase equilibrium lines 2. Further, all of them are in the area between the saturated vapor line and the saturated liquid line of the phase equilibrium lines 1 (corresponding to R22 at 0° C.). Therefore, the mixture is in the phase equilibrium state at 0° C. under pressure of 4.044 kg/cm$^2$G which correspond to the saturated state of R22.

Then, the working fluid having the composition in Table 1 is in the saturated state or the phase equilibrium state under the saturated vapor pressure condition of R22 at 0° C. and 50° C., so that, in the utilization temperature range between about 0° C. and about 50° C., the working fluid has substantially the same condensation and evaporation temperatures as R22 when operated under the saturated vapor pressure of R22 at said temperatures.

In the above, the mixtures having the compositions on the phase equilibrium lines 2 (corresponding to R22 at 50° C.) have been explained. In addition, when working fluids having compositions in the area inside the points A1 to F1, namely those having compositions which realize the phase equilibrium states at 0° C. under pressure of 4.044 kg/cm$^2$G and at 50° C. under pressure of 18.782 kg/cm$^2$G both corresponding to the saturated state of R22 are operated in the similar way to the above, condensation and evaporation temperatures which are substantially the same as those of R22 can be achieved in the utilization temperature range between about 0° C. and about 50° C.

Figure 2:
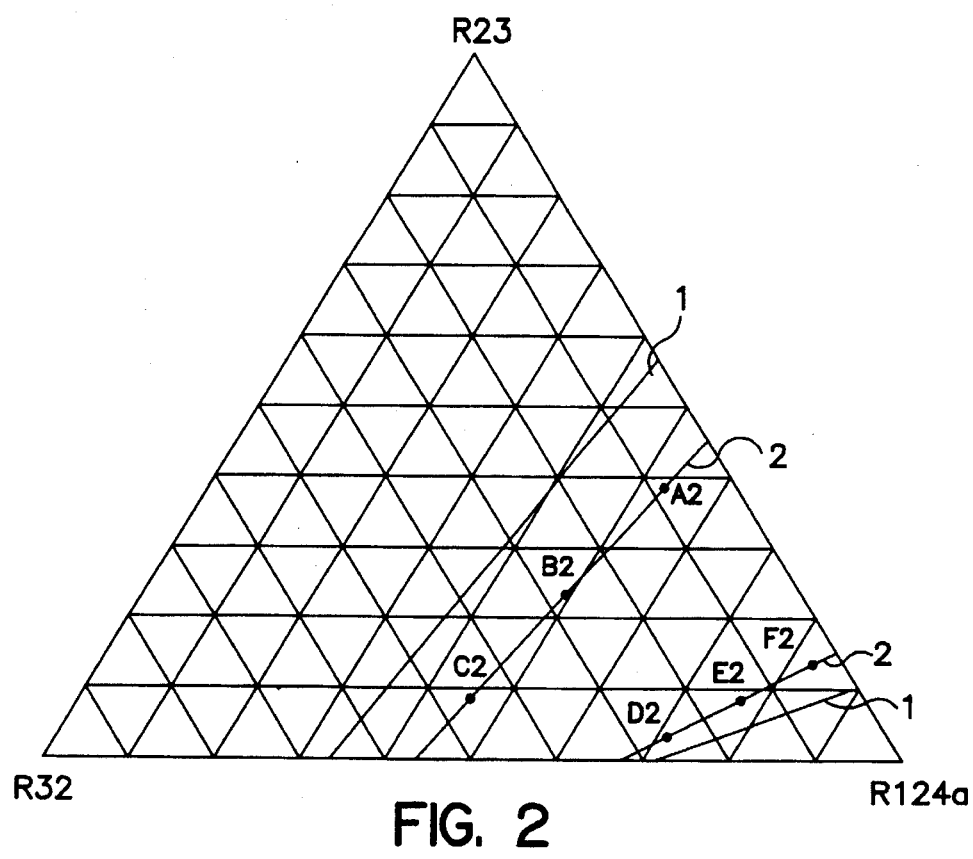

FIG. 2 shows a ternary composition diagram indicating equilibrium states of a mixture consisting of R23, R32 and 1-chloro-1,1,2,2-tetrafluoroethane (R124a) at specific temperatures under specific pressure in a triangular coordinate. In FIG. 2, the lines 1 are phase equilibrium lines of the mixture at 0° C. under pressure of 4.044 kg/cm$^2$G, and the lines 2 are phase equilibrium lines of the mixture at 50° C. under pressure of 18.782 kg/cm$^2$G As understood from FIG. 2, the mixture comprising about 0 to about 55% by weight (for example, about 1 to about 55% by weight) of R23, about 0 to about 65% by weight (for example, about 1 to about 65% by weight) of R32 and about 35 to about 90% by weight of R124a is preferred, since it has substantially the same vapor pressure as R22 in the utilization temperature range between about 0° C. and about 50° C. Further, the mixture comprising about 0 to about 45% by weight (for example, about 1 to about 45% by weight) of R23, about 0 to about 55% by weight (for example, about 1 to about 55% by weight) of R32 and about 45 to about 85% by weight of R124a is more preferred, since it has substantially the same vapor pressure as R22 at all the utilizing temperatures between 0° C. and 50° C.

The compositions of the working fluids at the points A2 to F2 in FIG. 2 are shown in Table 2.

TABLE 2

| Point | A2 | B2 | C2 | D2 | E2 | F2 |
|---|---|---|---|---|---|---|
| R23 (wt. %) | 39.3 | 25.7 | 9.3 | 2.9 | 8.0 | 12.4 |
| R32 (wt. %) | 7.8 | 24.6 | 45.0 | 25.4 | 13.9 | 4.4 |
| R124a (wt. %) | 52.9 | 49.7 | 45.7 | 71.7 | 78.1 | 83.2 |

The points A2, B2 and C2 are on the saturated vapor line of the phase equilibrium lines 2 (corresponding to R22 at 50° C.), and the points D2, E2 and F2 are on the saturated liquid line of the phase equilibrium lines 2. Further, all of them are in the area between the saturated vapor line and the saturated liquid line of the phase equilibrium lines 1 (corresponding to R22 at 0° C.). Therefore, the mixture is in the phase equilibrium state at 0° C. under pressure of 4.044 kg/cm$^2$G which correspond to the saturated state of R22.

Then, the working fluid having the composition in Table 2 is in the saturated state or the phase equilibrium state under the saturated vapor pressure condition of R22 at 0° C. and 50° C., so that, in the utilization temperature range between about 0° C. and about 50° C., the working fluid has substantially the same condensation and evaporation temperatures as R22 when operated under the saturated vapor pressure of R22 at said temperatures.

In the above, the mixtures having the compositions on the phase equilibrium lines 2 (corresponding to R22 at 50° C.) have been explained. In addition, when working fluids having compositions in the area inside the points A2 to F2, namely those having compositions which realize the phase equilibrium states at 0° C. under pressure of 4.044 kg/cm$^2$G and at 50° C. under pressure of 18.782 kg/cm$^2$G both corresponding to the saturated state of R22 are operated in the similar way to the above, condensation and evaporation temperatures which are substantially the same as those of R22 can be achieved in the utilization temperature range between about 0° C. and about 50° C.

From FIGS. 1 and 2, it is understood that the mixture comprising about 0 to about 55% by weight (for example, about 1 to about 55% by weight) of R23, about 0 to about 65% by weight (for example, about 1 to about 65% by weight) of R32 and about 35 to about 90% by weight of chlorotetrafluoroethane is preferred, since it has substantially the same vapor pressure as R22 in the utilization temperature range between about 0° C. and about 50° C. Further, the mixture comprising about 0 to about 45% by weight (for example, about 1 to about 45% by weight) of R23, about 0 to about 55% by weight (for example, about 1 to about 55% by weight) of R32 and about 45 to about 85% by weight of chlorotetrafluoroethane is more preferred, since it has substantially the same vapor pressure as R22 at all the utilizing temperatures between 0° C. and 50° C.

In addition, since ODP of the working fluids comprising the above combination of the components in the above composition range is expected to be 0.007 to 0.018, it is extremely promising as a substitute working fluid for R22. Since nonflammable chlorotetrafluoroethane is used as a fluorinated halocarbon having very small ODP and the nonflammable trifluoromethane is selected as one of the fluorinated methane or ethane derivatives having substantially no ODP, flammability of difluoromethane which is selected as one of the fluorinated methane or ethane derivatives having substantially no ODP can be suppressed.

Example 2

Figure 3:
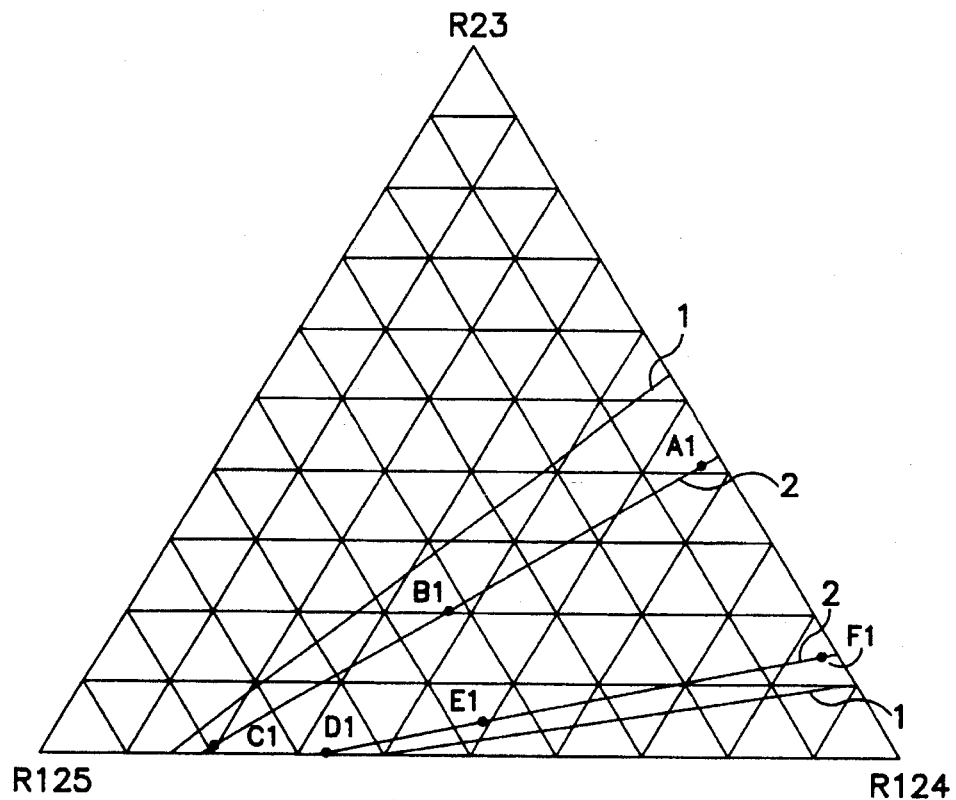

FIG. 3 shows a ternary composition diagram indicating equilibrium states of a mixture consisting of trifluoromethane (R23), pentafluoroethane (R125) and 2-chloro-1,1,1,2-tetrafluoroethane (R124) at specific temperatures under specific pressure in a triangular coordinate.

The compositions of the working fluids at the points A1 to F1 in FIG. 3 are shown in Table 3.

TABLE 3

| Point | A1 | B1 | C1 | D1 | E1 | F1 |
|---|---|---|---|---|---|---|
| R23 (wt. %) | 41.1 | 20.2 | 1.4 | 0.6 | 4.9 | 13.5 |
| R125 (wt. %) | 3.1 | 42.3 | 78.9 | 65.9 | 45.1 | 2.1 |
| R124 (wt. %) | 55.8 | 37.5 | 19.7 | 33.5 | 50.0 | 84.4 |

As understood from FIG. 3, the mixture comprising about 0 to about 55% by weight (for example, about 1 to about 55% by weight) of R23, about 0 to about 85% by weight (for example, about 1 to about 85% by weight) of R125 and about 15 to about 90% by weight of R124 is preferred, since it has substantially the same vapor pressure as R22 in the utilization temperature range between about 0° C. and about 50° C. Further, the mixture comprising about 0 to about 45% by weight (for example, about 1 to about 45% by weight) of R23, about 0 to about 80% by weight (for example, about 1 to about 80% by weight) of R125 and about 20 to about 85% by weight of R124 is more preferred, since it has substantially the same vapor pressure as R22 at all the utilizing temperatures between 0° C. and 50° C.

Figure 4:
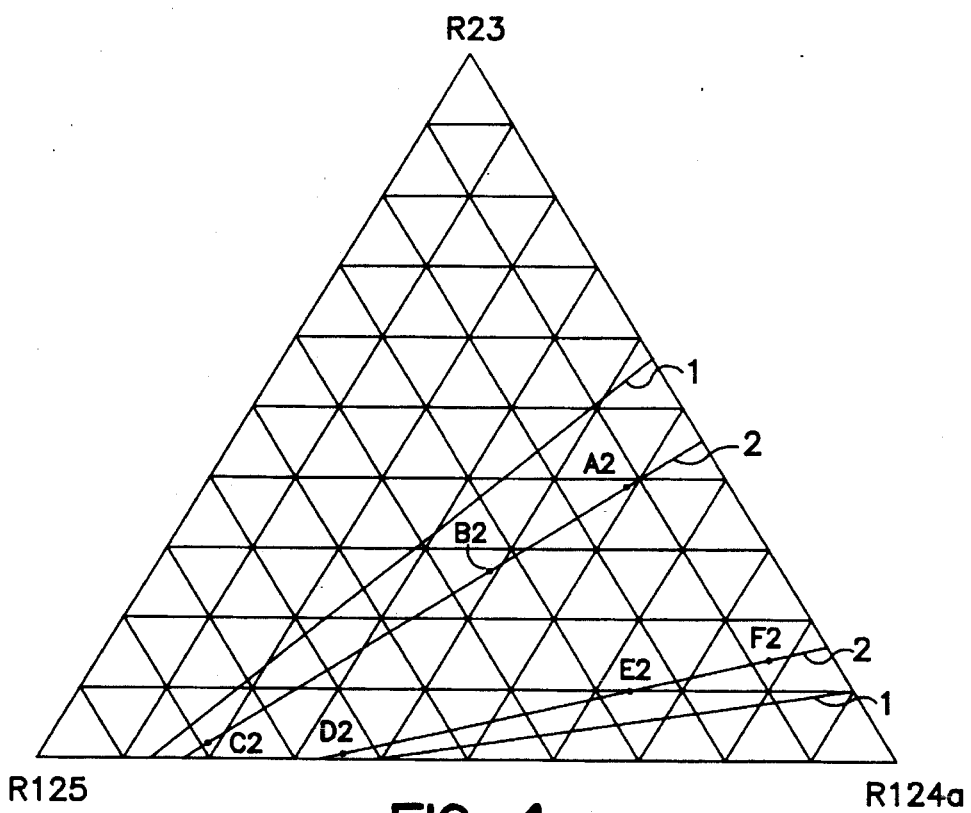

FIG. 4 shows a ternary composition diagram indicating equilibrium states of a mixture consisting of R23, R125 and 1-chloro-1,1,2,2-tetrafluoroethane (R124a) at specific temperatures under specific pressure in a triangular coordinate.

The compositions of the working fluids at the points A2 to F2 in FIG. 4 are shown in Table 4.

TABLE 4

| Point | A2 | B2 | C2 | D2 | E2 | F2 |
|---|---|---|---|---|---|---|
| R23 (wt. %) | 39.0 | 26.7 | 2.0 | 0.9 | 9.6 | 12.9 |
| R125 (wt. %) | 11.6 | 33.7 | 79.3 | 65.9 | 24.3 | 7.8 |
| R124a (wt. %) | 49.4 | 39.6 | 18.7 | 33.2 | 66.1 | 79.3 |

As understood from FIG. 4, the mixture comprising about 0 to about 55% by weight (for example, about 1 to about 55% by weight) of R23, about 0 to about 85% by weight (for example, about 1 to about 85% by weight) of R125 and about 15 to about 90% by weight of R124a is preferred, since it has substantially the same vapor pressure as R22 in the utilization temperature range between about 0° C. and about 50° C. Further, the mixture comprising about 0 to about 45% by weight (for example, about 1 to about 45% by weight) of R23, about 0 to about 85% by weight (for example, about 0 to about 85% by weight) of R125 and about 15 to about 85% by weight of R124a is more preferred, since it has substantially the same vapor pressure as R22 at all the utilizing temperatures between 0° C. and 50° C.

From FIGS. 3 and 4, it is understood that the mixture comprising about 0 to about 55% by weight (for example, about 1 to about 55% by weight) of R23, about 0 to about 85% by weight (for example, about 1 to about 85% by weight) of R125 and about 15 to about 90% by weight of chlorotetrafluoroethane is preferred, since it has substantially the same vapor pressure as R22 in the utilization temperature range between about 0° C. and about 50° C. Further, the mixture comprising about 0 to about 45% by weight (for example, about 1 to about 45% by weight) of R23, about 0 to about 85% by weight (for example, about 1 to about 85% by weight) of R125 and about 15 to about 85% by weight of chlorotetrafluoroethane is more preferred, since it has substantially the same vapor pressure as R22 at all the utilizing temperatures between 0° C. and 50° C.

In addition, since ODP of the working fluids comprising the above combination of the components in the above composition range is expected to be 0.003 to 0.018, it is extremely promising as a substitute working fluid for R22. Since nonflammable chlorotetrafluoroethane is used as a fluorinated halocarbon having very small ODP and trifluoromethane and pentafluoroethane which are both nonflammable are selected as the fluorinated methane or ethane derivatives having substantially no ODP, the mixture can be made nonflammable.

EXAMPLE 3

Figure 5:
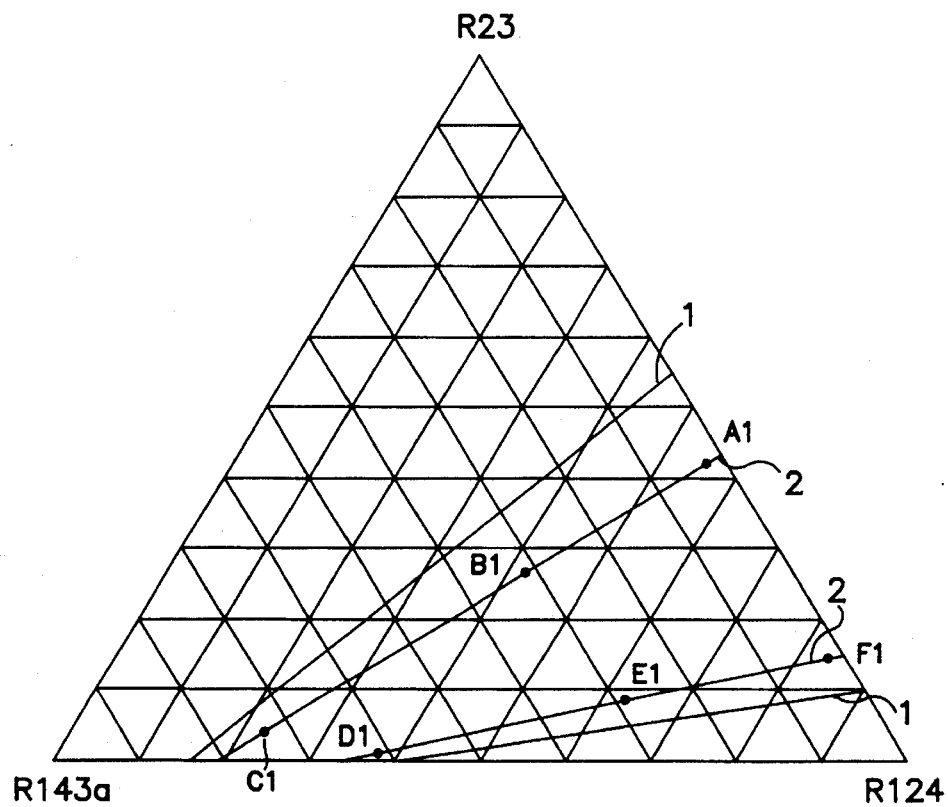

FIG. 5 shows a ternary composition diagram indicating equilibrium states of a mixture consisting of trifluoromethane (R23), 1,1,1-trifluoroethane (R143a) and 2-chloro-1,1,1,2-tetrafluoroethane (R124) at specific temperatures under specific pressure in a triangular coordinate.

The compositions of the working fluids at the points A1 to F1 in FIG. 5 are shown in Table 5.

TABLE 5

| Point | A1 | B1 | C1 | D1 | E1 | F1 |
|---|---|---|---|---|---|---|
| R23 (wt. %) | 41.7 | 26.1 | 3.7 | 1.5 | 8.2 | 13.7 |
| R143a (wt. %) | 2.0 | 30.7 | 73.6 | 61.5 | 29.1 | 1.4 |
| R124 (wt. %) | 56.3 | 43.2 | 22.7 | 37.0 | 62.7 | 84.9 |

As understood from FIG. 5, the mixture comprising about 0 to about 55% by weight (for example, about 1 to about 55% by weight) of R23, about 0 to about 85% by weight (for example, about 1 to about 85% by weight) of R143a and about 15 to about 90% by weight of R124 is preferred, since it has substantially the same vapor pressure as R22 in the utilization temperature range between about 0° C. and about 50° C. Further, the mixture comprising about 0 to about 45% by weight (for example, about 1 to about 45% by weight) of R23, about 0 to about 80% by weight (for example, about 1 to about 80% by weight) of R143a and about 20 to about 85% by weight of R124 is more preferred, since it has substantially the same vapor pressure as R22 at all the utilizing temperatures between 0° C. and 50° C.

Figure 6:
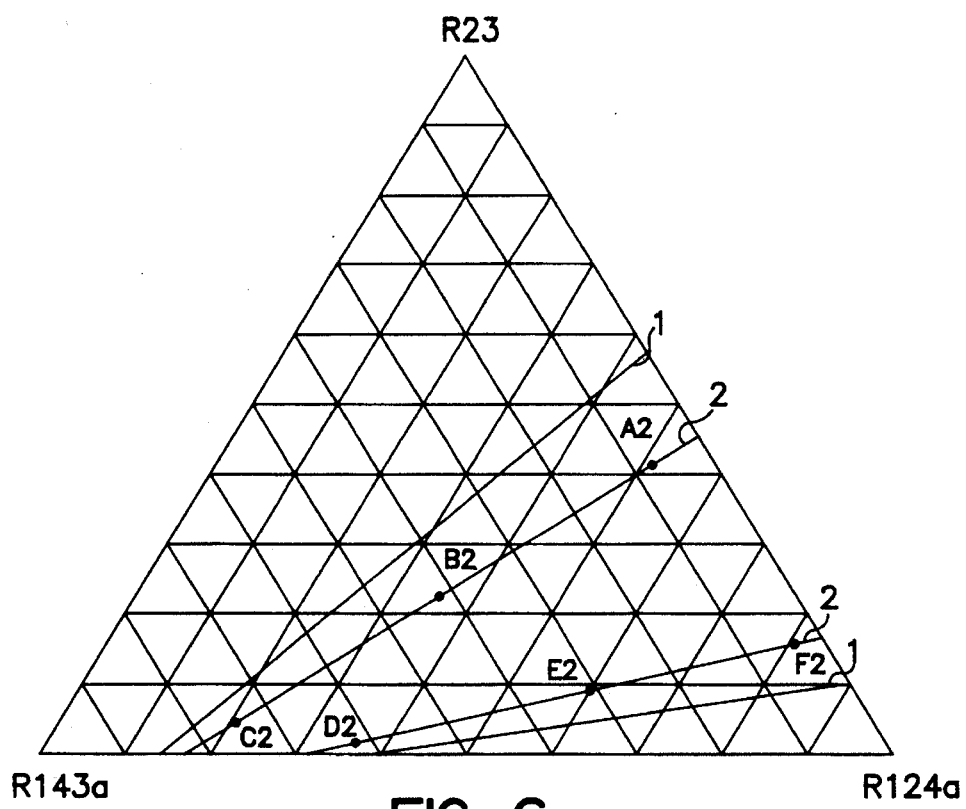

FIG. 6 shows a ternary composition diagram indicating equilibrium states of a mixture consisting of R23, R143a and 1-chloro-1,1,2,2-tetrafluoroethane (R124a) at specific temperatures under specific pressure in a triangular coordinate.

The compositions of the working fluids at the points A2 to F2 in FIG. 6 are shown in Table 6.

TABLE 6

| Point | A2 | B2 | C2 | D2 | E2 | F2 |
|---|---|---|---|---|---|---|
| R23 (wt. %) | 41.2 | 22.6 | 4.4 | 1.8 | 8.3 | 13.4 |
| R143a (wt. %) | 7.6 | 40.6 | 74.1 | 61.5 | 31.0 | 5.4 |
| R124a (wt. %) | 51.2 | 36.8 | 21.5 | 36.7 | 60.7 | 81.2 |

As understood from FIG. 6, the mixture comprising about 0 to about 55% by weight (for example, about 1 to about 55 % by weight.) of R23, about 0 to about 85% by weight (for example, about 1 to about 85% by weight) of R143a and about 15 to about 90% by weight of R124a is preferred, since it has substantially the same vapor pressure as R22 in the utilization temperature range between about 0° C. and about 50° C. Further, the mixture comprising about 0 to about 45% by weight (for example, about 1 to about 45% by weight) of R23, about 0 to about 80% by weight (for example, about 1 to about 80% by weight) of R143a and about 20 to about 85% by weight of R124a is more preferred, since it has substantially the same vapor pressure as R22 at all the utilizing temperatures between 0° C. and 50° C.

From FIGS. 5 and 6, it is understood that the mixture comprising about 0 to about 55% by weight (for example, about 1 to about 55% by weight) of R23, about 0 to about 85% by weight (for example, about 1 to about 85% by weight) of trifluoroethane and about 15 to about 90% by weight of chlorotetrafluoroethane is preferred, since it has substantially the same vapor pressure as R22 in the utilization temperature range between about 0° C. and about 50° C. Further, the mixture comprising about 0 to about 45% by weight (for example, about 1 to about 45% by weight) of R23, about 0 to about 80% by weight (for example, about 1 to about 80% by weight) of trifluoroethane and about 20 to about 85% by weight of chlorotetrafluoroethane is more preferred, since it has substantially the same vapor pressure as R22 at all the utilizing temperatures between 0° C. and 50° C.

In addition, since ODP of the working fluids comprising the above combination of the components in the above composition range is expected to be 0.003 to 0.018, it is extremely promising as a substitute working fluid for R22. Since nonflammable chlorotetrafluoroethane is used as a fluorinated halocarbon having very small ODP and the nonflammable trifluoromethane is selected as one of the fluorinated methane or ethane derivatives having substantially no ODP, flammability of trifluoroethane which is selected as one of the fluorinated methane or ethane derivatives having substantially no ODP can be suppressed.

Example 4

Figure 7:
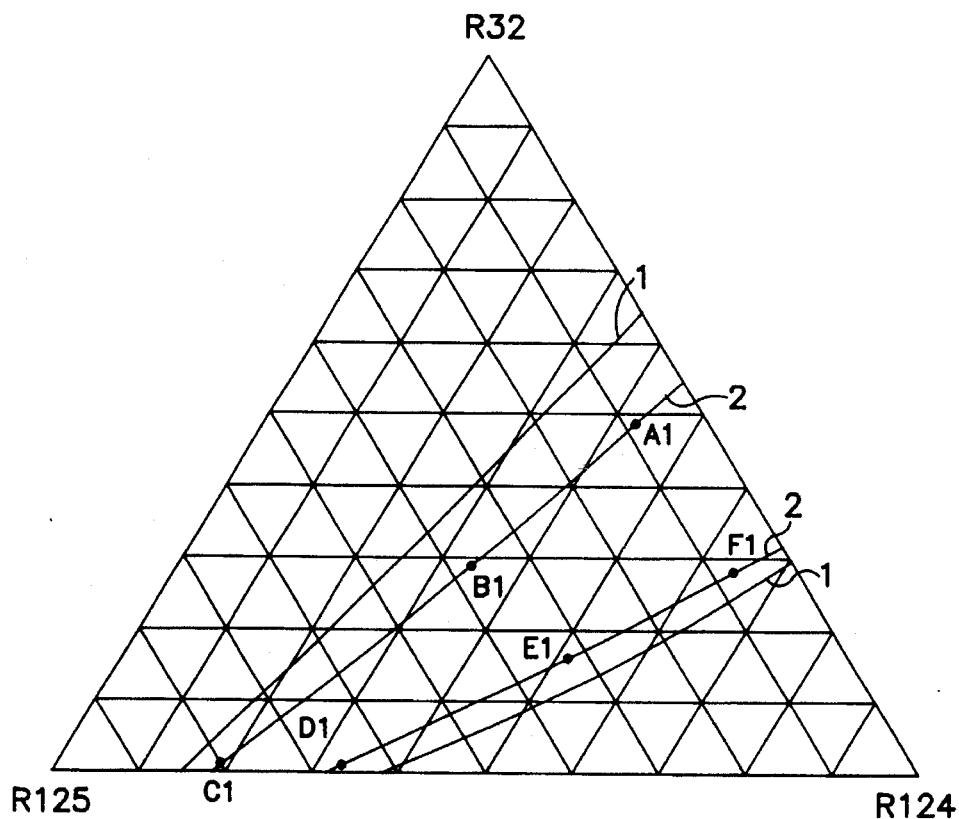

FIG. 7 shows a ternary composition diagram indicating equilibrium states of a mixture consisting of difluoromethane (R32), pentafluoroethane (R125) and 2-chloro-1,1,1,2-tetrafluoroethane (R124) at specific temperatures under specific pressure in a triangular coordinate.

In FIG. 7, the lines 1 are phase equilibrium lines of the mixture at 0° C. under pressure of 4.044 kg/cm$^2$G. These temperature and pressure correspond to a saturated state of R22. The upper-one of the phase equilibrium lines 1 (corresponding to R22 at 0° C.) is a saturated vapor line, and the lower one is a saturated liquid line. In the area between these two lines, the mixture is in the phase equilibrium state. The lines 2 are phase equilibrium lines of the mixture at 50° C. under pressure of 18.782 kg/cm$^2$G. These temperature and pressure correspond to a saturated state of R22.

As understood from FIG. 7, the mixture comprising about 0 to about 65% by weight (for example, about 1 to about 65%) by weight) of R32, about 0 to about 85% by weight (for example, about 1 to about 85% by weight) of R125 and about 15 to about 70% by weight of R124 is preferred, since it has substantially the same vapor pressure as R22 in the utilization temperature range between about 0° C. and about 50° C. Further, the mixture comprising about 0 to about 55% by weight (for example, about 1 to about 55% by weight) of R32, about 0 to about 80% by weight (for example, about 1 to about 80% by weight) of R125 and about 20 to about 70% by weight of R124 is more preferred, since it has substantially the same vapor pressure as R22 at all the utilizing temperatures between 0° C. and 50° C.

The compositions of the working fluids at the points A1 to F1 in FIG. 7 are shown in Table 7.

TABLE 7

| Point | A1 | B1 | C1 | D1 | E1 | F1 |
|---|---|---|---|---|---|---|
| R32 (wt. %) | 47.8 | 28.9 | 0.6 | 0.4 | 14.7 | 27.8 |
| R125 (wt. %) | 8.5 | 36.0 | 80.6 | 67.7 | 32.6 | 5.5 |
| R124 (wt %) | 43.7 | 35.1 | 18.8 | 31.9 | 52.7 | 66.7 |

The points A1, B1 and C1 are on the saturated vapor line of the phase equilibrium lines 2 (corresponding to R22 at 50° C.), and the points D1, E1 and F1 are on the saturated liquid line of the phase equilibrium lines 2. Further, all of them are in the area between the saturated vapor line and the saturated liquid line of the phase equilibrium lines 1 (corresponding to R22 at 0° C.). Therefore, the mixture is in the phase equilibrium state at 0° C. under pressure of 4.044 kg/cm²G which correspond to the saturated state of R22.

Then, the working fluid having the composition in Table 7 is in the saturated state or the phase equilibrium state under the saturated vapor pressure condition of R22 at 0° C. and 50° C., so that, in the utilization temperature range between about 0° C. and about 50° C., the working fluid has substantially the same condensation and evaporation temperatures as R22 when operated under the saturated vapor pressure of R22 at said temperatures.

In the above, the mixtures having the compositions on the phase equilibrium lines 2 (corresponding to R22 at 50° C.) have been explained. In addition, when working fluids having compositions in the area inside the points A1 to F1, namely those having compositions which realize the phase equilibrium states at 0° C. under pressure of 4.044 kg/cm²G and at 50° C. under pressure of 18.782 kg/cm²G both corresponding to the saturated state of R22 are operated in the similar way to the above, condensation and evaporation temperatures which are substantially the same as those of R22 can be achieved in the utilization temperature range between about 0° C. and about 50° C.

Figure 8:
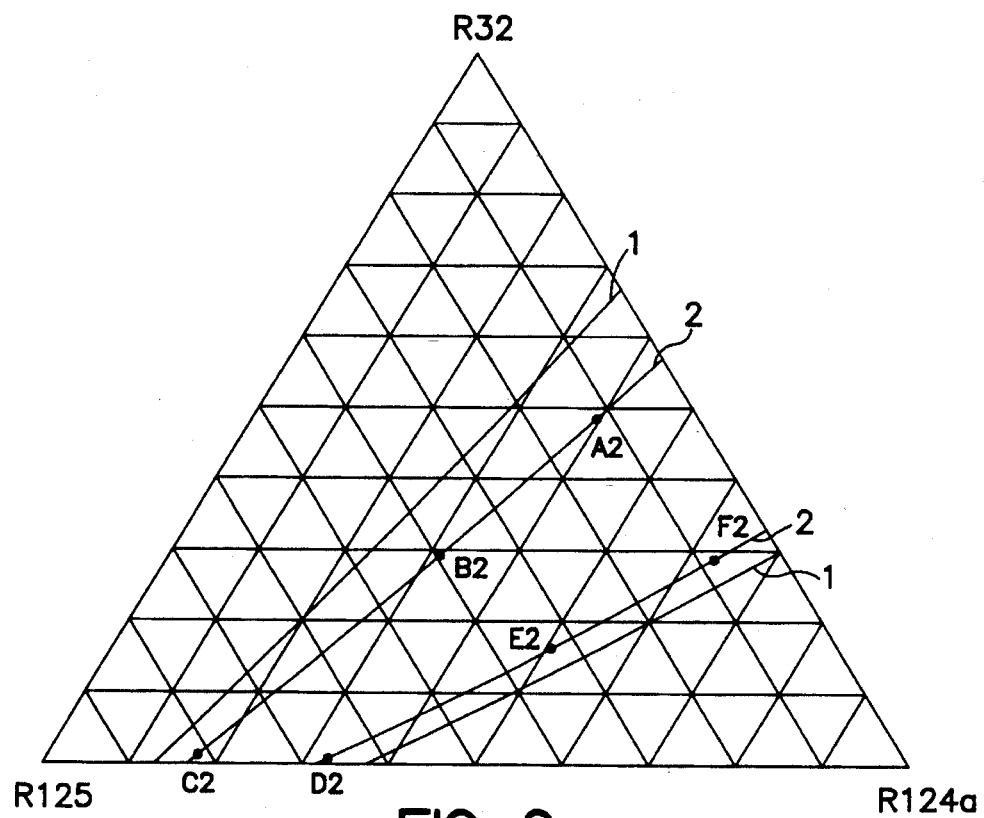

FIG. 8 shows a ternary composition diagram indicating equilibrium states of a mixture consisting of R32, R125 and 1-chloro-1,1,2,2-tetrafluoroethane (R124a) at specific temperatures under specific pressure in a triangular coordinate.

In FIG. 8, the lines 1 are phase equilibrium lines of the mixture at 0° C. under pressure of 4.044 kg/cm²G. These temperature and pressure correspond to a saturated state of R22, and the lines 2 are phase equilibrium lines of the mixture at 50° C. under pressure of 18.782 kg/cm²G.

As understood from FIG. 8, the mixture comprising about 0 to about 65% by weight (for example, about 1 to about 65% by weight) of R32, about 0 to about 85% by weight (for example, about 1 to about 85% by weight) of R125 and about 15 to about 70% by weight of R124a is preferred, since it has substantially the same vapor pressure as R22 in the utilization temperature range between about 0° C. and about 50° C. Further, the mixture comprising about 0 to about 55% by weight (for example, about 1 to about 55% by weight) of R32, about 0 to about 85% by weight (for example, about 1 to about 80% by weight) of R125 and about 15 to about 70% by weight of R124a is more preferred, since it has substantially the same vapor pressure as R22 at all the utilizing temperatures between 0° C. and 50° C.

The compositions of the working fluids at the points A2 to F2 in FIG. 8 are shown in Table 8.

TABLE 8

| Point | A2 | B2 | C2 | D2 | E2 | F2 |
|---|---|---|---|---|---|---|
| R32 (wt. %) | 47.9 | 28.2 | 1.0 | 0.7 | 14.8 | 27.9 |
| R125 (wt. %) | 12.1 | 39.9 | 81.4 | 68.0 | 34.0 | 7.5 |
| R124 (wt. %) | 40.0 | 31.9 | 17.6 | 31.3 | 51.2 | 64.6 |

The points A2, B2 and C2 are on the saturated vapor line of the phase equilibrium lines 2 (corresponding to R22 at 50° C.), and the points D2, E2 and F2 are on the saturated liquid line of the phase equilibrium lines 2. Further, all of them are in the area between the saturated vapor line and the saturated liquid line of the phase equilibrium lines 1 (corresponding to R22 at 0° C.). Therefore, the mixture is in the phase equilibrium state at 0° C. under pressure of 4.044 kg/cm²G which correspond to the saturated state of R22.

Then, the working fluid having the composition in Table 8 is in the saturated state or the phase equilibrium state under the saturated vapor pressure condition of R22 at 0° C. and 50° C., so that, in the utilization temperature range between about 0° C. and about 50° C., the working fluid has substantially the same condensation and evaporation temperatures as R22 when operated under the saturated vapor pressure of R22 at said temperatures.

In the above, the mixtures having the compositions on the phase equilibrium lines 2 (corresponding to R22 at 50° C.) have been explained. In addition, when working fluids having compositions in the area inside the points A2 to F2, namely those having compositions which realize the phase equilibrium states at 0° C. under pressure of 4.044 kg/cm²G and at 50° C. under pressure of 18.782 kg/cm²G both corresponding to the saturated state of R22 are operated in the similar way to the above, condensation and evaporation temperatures which are substantially the same as those of R22 can be achieved in the utilization temperature range between about 0° C. and about 50° C.

From FIGS. 7 and 8, it is understood that the mixture comprising about 0 to about 65% by weight (for example, about 1 to about 65% by weight) of R32, about 0 to about 85% by weight (for example, about 1 to about 85% by weight) of R125 and about 15 to about 70% by weight of chlorotetrafluoroethane is preferred, since it has substantially the same vapor pressure as R22 in the utilization temperature range between about 0° C. and about 50° C. Further, the mixture comprising about 0 to about 55% by weight (for example, about 1 to about 55% by weight) of R32, about 0 to about 85% by weight (for example, about 1 to about 85% by weight) of R125 and about 15 to about 70% by weight of chlorotetrafluoroethane is more preferred, since it has substantially the same vapor pressure as R22 at all the utilizing temperatures between 0° C. and 50° C.

In addition, since ODP of the working fluids comprising the above combination of the components in the above composition range is expected to be 0.003 to 0.014, it is extremely promising as a substitute working fluid for R22. Since nonflammable chlorotetrafluoroethane is used as a fluorinated halocarbon having very small ODP and the nonflammable pentafluoroethane is selected as one of the fluorinated methane or ethane derivatives having substantially no ODP, flammability of difluoromethane which is selected as one of the fluorinated methane or ethane derivatives having substantially no ODP can be suppressed.

EXAMPLE 5

Figure 9:
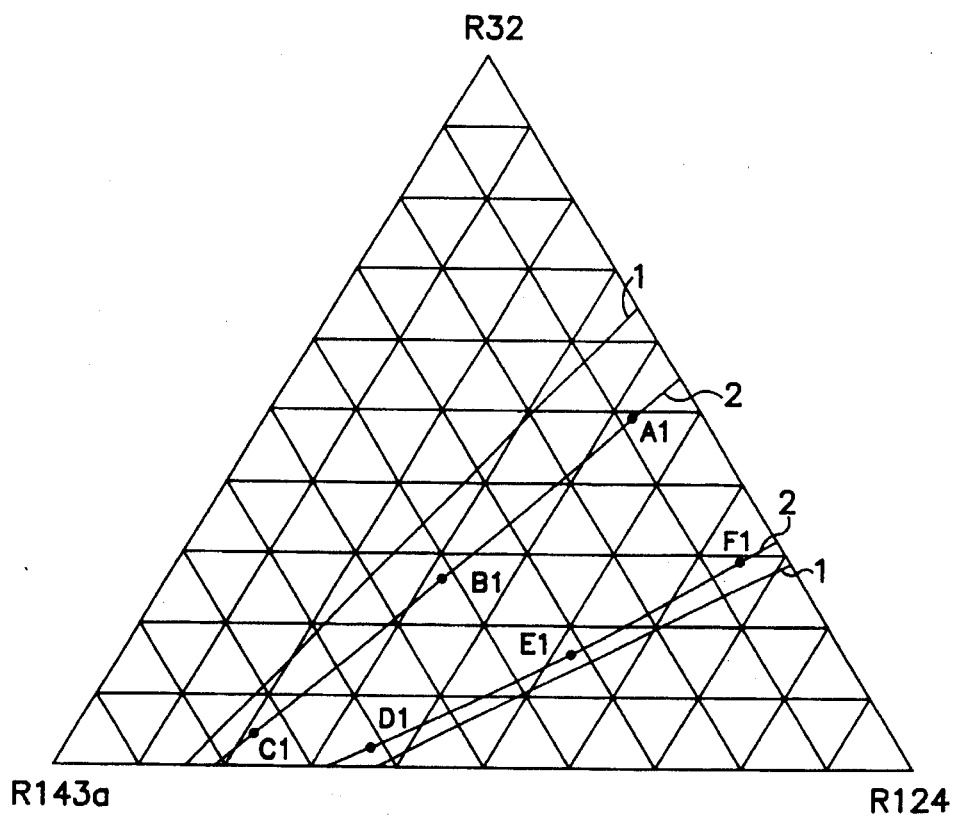

FIG. 9 shows a ternary composition diagram indicating equilibrium states of a mixture consisting of R32, 1,1,1-trifluoroethane (R143a) and R124 at specific temperatures under specific pressure in a triangular coordinate.

The compositions of the working fluids at the points A1 to F1 in FIG. 9 are shown in Table 9.

TABLE 9

| Point | A1 | B1 | C1 | D1 | E1 | F1 |
|---|---|---|---|---|---|---|
| R32 (wt. %) | 49.1 | 25.7 | 3.5 | 2.4 | 16.1 | 28.4 |
| R143a (wt. %) | 6.8 | 41.2 | 75.3 | 62.9 | 31.4 | 4.7 |
| R124 (wt. %) | 44.1 | 33.1 | 21.2 | 34.7 | 52.5 | 66.9 |

As understood from FIG. 9, the mixture comprising about 0 to about 65% by weight (for example, about 1 to about 65% by weight) of R32, about 0 to about 85% by weight (for example, about 1 to about 85% by weight) of R143a and about 15 to about 70% by weight of R124 is preferred, since it has substantially the same vapor pressure as R22 in the utilization temperature range between about 0° C. and about 50° C. Further, the mixture comprising about 0 to about 55% by weight (for example, about 1 to about 55% by weight) of R32, about 0 to about 80% by weight (for example, about 1 to about 80% by weight) of R143a and about 20 to about 70% by weight of R124 is more preferred, since it has substantially the same vapor pressure as R22 at all the utilizing temperatures between 0° C. and 50° C.

Figure 10:
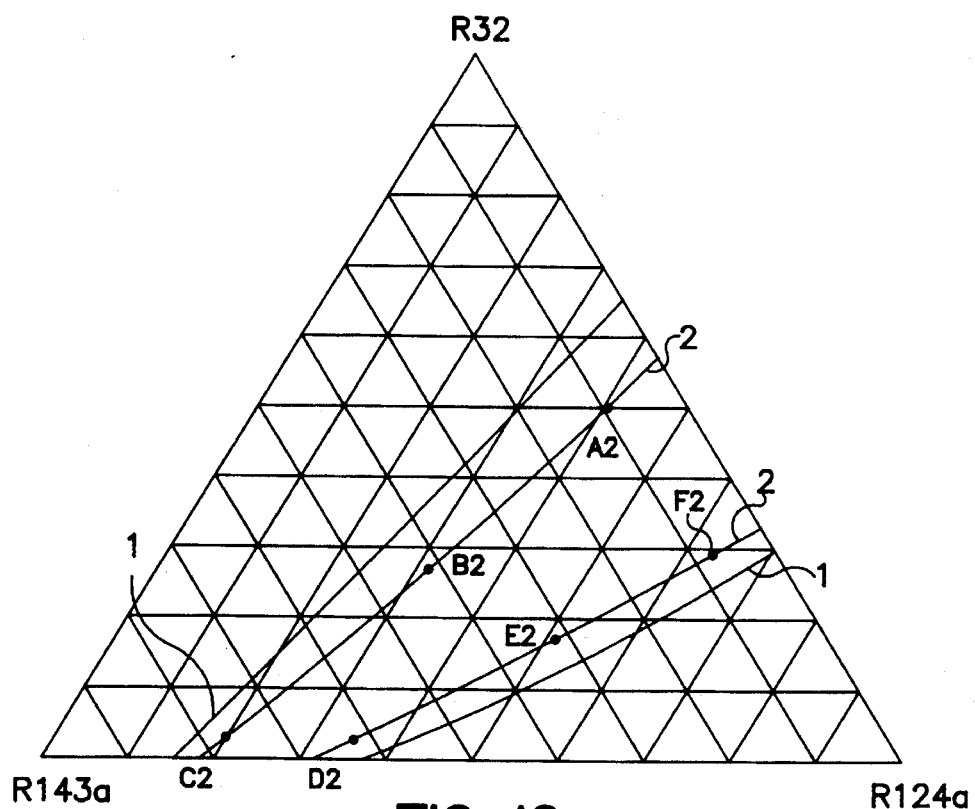

FIG. 10 shows a ternary composition diagram indicating equilibrium states of a mixture consisting of R32, R125 and 1-chloro-1,1,2,2-tetrafluoroethane (R124a) at specific temperatures under specific pressure in a triangular coordinate.

The compositions of the working fluids at the points A2 to F2 in FIG. 10 are shown in Table 10.

TABLE 10

| Point | A2 | B2 | C2 | D2 | E2 | F2 |
|---|---|---|---|---|---|---|
| R32 (wt. %) | 49.9 | 27.1 | 4.2 | 2.8 | 16.8 | 28.7 |
| R143a (wt. %) | 9.4 | 41.8 | 76.0 | 63.2 | 31.6 | 6.5 |
| R124a (wt. %) | 40.7 | 31.1 | 19.8 | 34.0 | 51.6 | 64.8 |

As understood from FIG. 10, the mixture comprising about 0 to about 65% by weight (for example, about 1 to about 65% by weight) of R32, about 0 to about 85% by weight (for example, about 1 to about 85% by weight) of R143a and about 15 to about 70% by weight of R124a is preferred, since it has substantially the same vapor pressure as R22 in the utilization temperature range between about 0° C. and about 50° C. Further, the mixture comprising about 0 to about 55% by weight (for example, about 1 to about 55% by weight) of R32, about 0 to about 80% by weight (for example, about 1 to about 80% by weight) of R143a and about 20 to about 70% by weight of R124a is more preferred, since it has substantially the same vapor pressure as R22 at all the utilizing temperatures between 0° C. and 50° C.

From FIGS. 9 and 10, it is understood that the mixture comprising about 0 to about 65% by weight (for example, about 1 to about 55% by weight) of R32, about 0 to about 85% by weight (for example, about 1 to about 85% by weight) of trifluoroethane and about 15 to about 70% by weight of chlorotetrafluoroethane is preferred, since it has substantially the same vapor pressure as R22 in the utilization temperature range between about 0° C. and about 50° C. Further, the mixture comprising about 0 to about 55% by weight (for example, about 1 to about 55% by weight) of R32, about 0 to about 80% by weight (for example, about 1 to about 80% by weight) of trifluoroethane and about 20 to about 70% by weight of chlorotetrafluoroethane is more preferred, since it has substantially the same vapor pressure as R22 at all the utilizing temperatures between 0° C. and 50° C.

In addition, since ODP of the working fluids comprising the above combination of the components in the above composition range is expected to be 0.003 to 0.014, it is extremely promising as a substitute working fluid for R22. Since nonflammable chlorotetrafluoroethane is used as a fluorinated halocarbon having very small ODP, flammability of difluoromethane and trifluoroethane which are both selected as the fluorinated methane or ethane derivatives having substantially no ODP can be suppressed.

EXAMPLE 6

Figure 11:
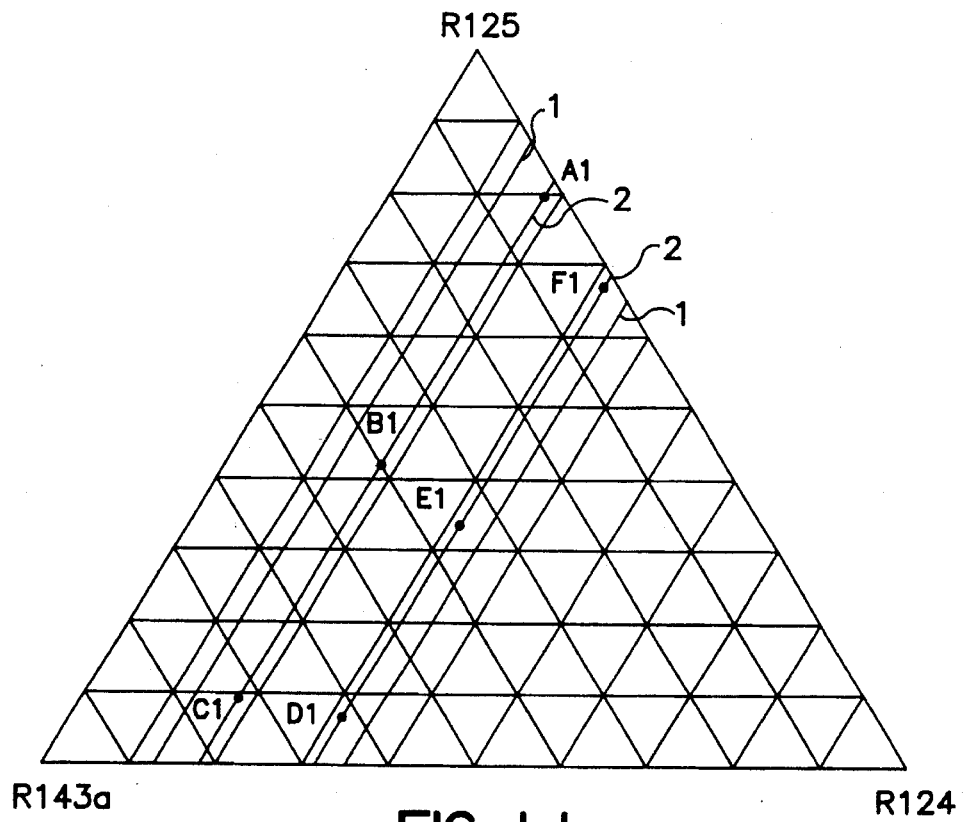

FIG. 11 shows a ternary composition diagram indicating equilibrium states of a mixture consisting of pentafluoroethane (R125), 1,1,1-trifluoroethane (R143a) and 2-chloro-1,1,2-tetrafluoroethane (R124) at specific temperatures under specific pressure in a triangular coordinate.

The compositions of the working fluids at the points A1 to F1 in FIG. 11 are shown in Table 11.

TABLE 11

| Point | A1 | B1 | C1 | D1 | E1 | F1 |
|---|---|---|---|---|---|---|
| R125 (wt. %) | 79.1 | 50.3 | 9.0 | 7.3 | 49.1 | 67.7 |
| R143a (wt. %) | 2.5 | 31.1 | 72.0 | 61.4 | 19.6 | 1.0 |
| R124 (wt. %) | 18.4 | 18.6 | 19.0 | 31.3 | 31.3 | 31.3 |

As understood from FIG. 11, the mixture comprising about 0 to about 85% by weight (for example, about 1 to about 85% by weight) of R125, about 0 to about 85% by weight (for example, about 1 to about 85% by weight) of R143a and about 15 to about 40% by weight of R124 is preferred, since it has substantially the same vapor pressure as R22 in the utilization temperature range between about 0° C. and about 50° C. Further, the mixture comprising about 0 to about 80% by weight (for example, about 1 to about 80% by weight) of R125, about 0 to about 80% by weight (for example, about 1 to about 80% by weight) of R143a and about 20 to about 30% by weight of R124 is more preferred, since it has substantially the same vapor pressure as R22 at all the utilizing temperatures between 0° C. and 50° C.

Figure 12:
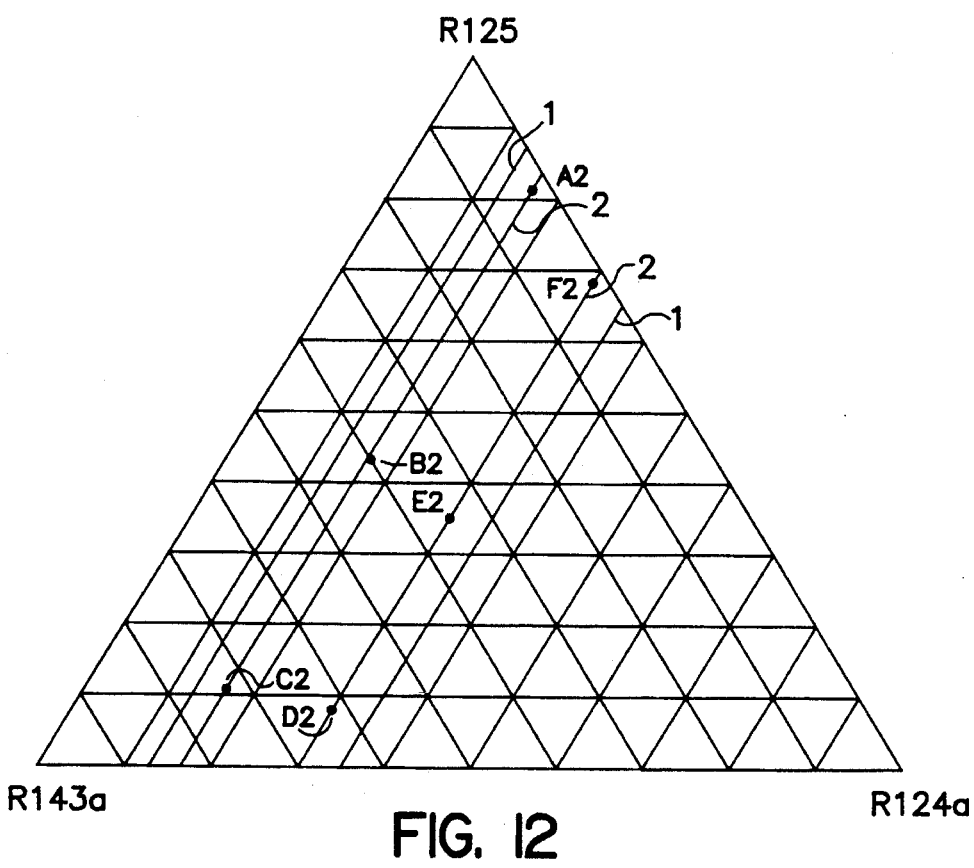

FIG. 12 shows a ternary composition diagram indicating equilibrium states of a mixture consisting of R125, R143a and 1-chloro-1,1,2,2-tetrafluoroethane (R124a) at specific temperatures under specific pressure in a triangular coordinate.

The compositions of the working fluids at the points A2 to F2 in FIG. 12 are shown in Table 12.

TABLE 12

| Point | A2 | B2 | C2 | D2 | E2 | F2 |
|---|---|---|---|---|---|---|
| R125 (wt. %) | 80.9 | 42.4 | 10.4 | 8.4 | 35.0 | 68.0 |
| R143a (wt. %) | 2.1 | 40.3 | 72.1 | 61.4 | 34.8 | 1.8 |
| R124a (wt. %) | 17.0 | 17.3 | 17.5 | 30.2 | 30.2 | 30.2 |

As understood from FIG. 12, the mixture comprising about 0 to about 85% by weight (for example, about 1 to about 85% by weight) of R125, about 0 to about 85% by weight (for example, about 1 to about 85% by weight) of R143a and about 15 to about 35% by weight of R124a is preferred, since it has substantially the same vapor pressure as R22 in the utilization temperature range between about 0° C. and about 50° C. Further, the mixture comprising about 0 to about 85% by weight (for example, about 1 to about 85% by weight) of R125, about 0 to about 80% by weight (for example, about 1 to about 80% by weight) of R143a and about 15 to about 30% by weight of R124a is more preferred, since it has substantially the same vapor pressure as R22 at all the utilizing temperatures between 0° C. and 50° C.

From FIGS. 11 and 12, it is understood that the mixture comprising about 0 to about 85% by weight (for example, about 1 to about 85% by weight) of R125, about 0 to about 85% by weight (for example, about 1 to about 85% by weight) of trifluoroethane and about 15 to about 40% by weight of chlorotetrafluoroethane is preferred, since it has substantially the same vapor pressure as R22 in the utilization temperature range between about 0° C. and about 50° C. Further, the mixture comprising about 0 to about 85% by weight (for example, about 1 to about 85% by weight) of R125, about 0 to about 80% by weight (for example, about 1 to about 80% by weight) of trifluoroethane and about 15 to about 30% by weight of chlorotetrafluoroethane is more preferred, since it has substantially the same vapor pressure as R22 at all the utilizing temperatures between 0° C. and 50° C.

In addition, since ODP of the working fluids comprising the above combination of the components in the above composition range is expected to be 0.003 to 0.008, it is extremely promising as a substitute working fluid for R22. Since nonflammable chlorotetrafluoroethane is used as a fluorinated halocarbon having very small ODP and nonflammabile pentafluoroethane is selected as one of the fluorinated methane or ethane derivatives having substantially no ODP, the flammability of trifluoroethane which is selected as one of the fluorinated methane or ethane derivatives having substantially no ODP can be suppressed.

From the above results, it is understood that the working fluid of the present invention preferably comprises 15 to 85% by weight of chlorotetrafluoroethane and at least two fluorinated halocarbons selected from about 0 to 55% by weight (e.g. 1 to 55% by weight) of trifluoromethane, about 0 to 65% by weight (e.g. 1 to 65% by weight) of difluoromethane, about 0 to 85% by weight (e.g. 1 to 85% by weight) of pentafluoroethane and about 0 to 85% by weight (e.g. 1 to 85% by weight) of trifluoroethane, more preferably, 15 to 85% by weight of chlorotetrafluoroethane and at least two fluorinated halocarbons selected from about 0 to 45% by weight (e.g. 1 to 45% by weight) of trifluoromethane, about 0 to 55% by weight (e.g. 1 to 55% by weight) of difluoromethane, about 0 to 85% by weight (e.g. 1 to 85% by weight) of pentafluoroethane and about 0 to 80 by weight (e.g. 1 to 80% by weight) of trifluoroethane.

While the working fluid in each of above Examples contained three fluorinated halocarbons, the working fluid of the present invention may comprise four or more fluorinated halocarbons including structural isomers.

Preferably, the working fluid of the present invention comprises chlorotetrafluoroethane and at least two fluorinated halocarbons selected from the group consisting of trifluoromethane, difluoromethane, pentafluoroethane and trifluoroethane.

Since the working fluid of the present invention has the above composition, it will have a smaller ODP than R22 and enlarge a range of the working fluids.

Since nonflammable chlorotetrafluoroethane is used as a fluorinated halocarbon having a very small ODP, the working fluid has suppressed flammability even if the fluorinated methane or ethane derivatives are flammable.

Since the working fluid of the present invention has substantially the same vapor pressure as R22 at the utilization temperature of the apparatus such as the air conditioner and the heat pump, it is used as a substitute working fluid in such apparatus.

The working fluid of the present invention is expected to have a high coefficient of performance with utilizing the temperature gradient of the non-azeotropic mixture.

What is claimed is:

1. A working fluid consisting of 17 to 90% by weight of chlorotetrafluoroethane, 1 to 85% by weight of 1,1,1-trifluoroethane, and one fluorinated hydrocarbon having a boiling point not higher than −40° C. under atmospheric pressure, selected from the group consisting of 1 to 55% by weight of trifluoromethane, 1 to 65% by weight of difluoromethane and 1 to 85% by weight of pentafluoroethane, which working fluid has a composition in a range between phase equilibrium lines in a triangular coordinate which are obtained when 0° C. is specified as a temperature and the same vapor pressure as that of chlorodifluoromethane at 0° C. is specified as a vapor pressure or a range between phase equilibrium lines in a triangular coordinate which are obtained when 50° C. is specified as a temperature and the same vapor pressure as that of chlorodifluoromethane at 50° C. is specified as a vapor pressure.

2. The working fluid as claimed in claim 1, which consists of 17 to 85% by weight of chlorotetrafluoroethane, 1 to 80% by weight of 1,1,1-trifluoroethane and one different fluorinated hydrocarbon selected from the group consisting of 1 to 45% by weight of trifluoromethane, 1 to 55% by weight of difluoromethane and 1 to 85% by weight of pentafluoroethane.

3. The working fluid as claimed in claim 1, which consists of about 1 to 55% by weight of trifluoromethane, about 1 to 85% by weight of 1,1,1-trifluoroethane and 17 to 90% by weight of chlorotetrafluoroethane.

4. The working fluid as claimed in claim 3, which consists of about 1 to 45% by weight of trifluoromethane, about 1 to 80% by weight of 1,1,1-trifluoroethane and 20 to 85% by weight of chlorotetrafluoroethane.

5. The working fluid as claimed in claim 1, which consists of about 1 to 65% by weight of difluoromethane, about 1 to 85% by weight of 1,1,1-trifluoroethane and 17 to 70% by weight of chlorotetrafluoroethane.

6. The working fluid as claimed in claim 5, which consists of about 1 to 55% by weight of difluoromethane, about 1 to 80% by weight of 1,1,1-trifluoroethane and 20 to 70% by weight of chlorotetrafluoroethane.

7. The working fluid as claimed in claim 1, which consists of about 1 to 80% by weight of pentafluoroethane, 1 to 85% by weight of 1,1,1-trifluoroethane and 17 to 40% by weight of chlorotetrafluoroethane.

8. The working fluid as claimed in claim 7, which consists of about 1 to 85% by weight of pentafluoroethane, about 1 to 80% by weight of 1,1,1-trifluoroethane and 15 to 30% by weight of chlorotetrafluoroethane.

* * * * *